Dec. 7, 1971          H. S. FOSTER          3,624,937
              IRON WITH CLEANABLE SPRAYER
Filed Dec. 15, 1970                    2 Sheets-Sheet 1
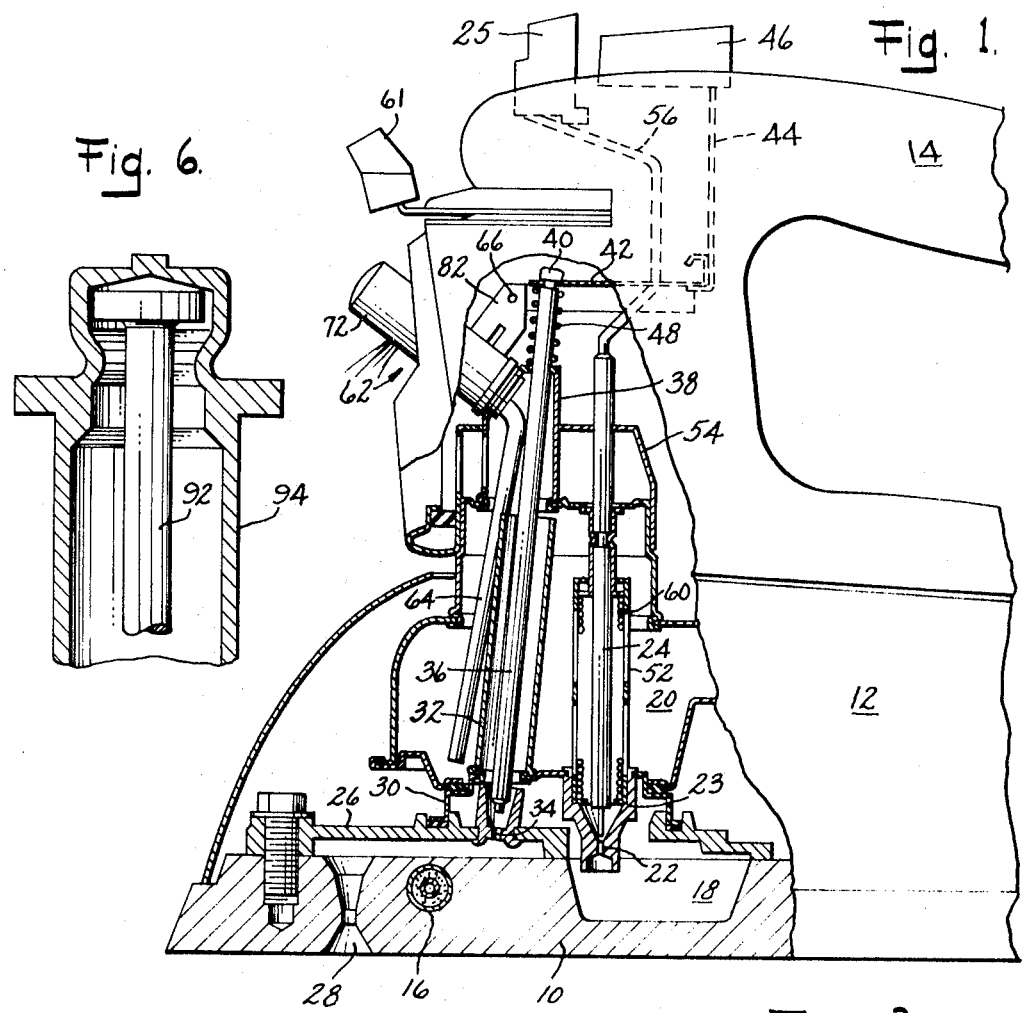
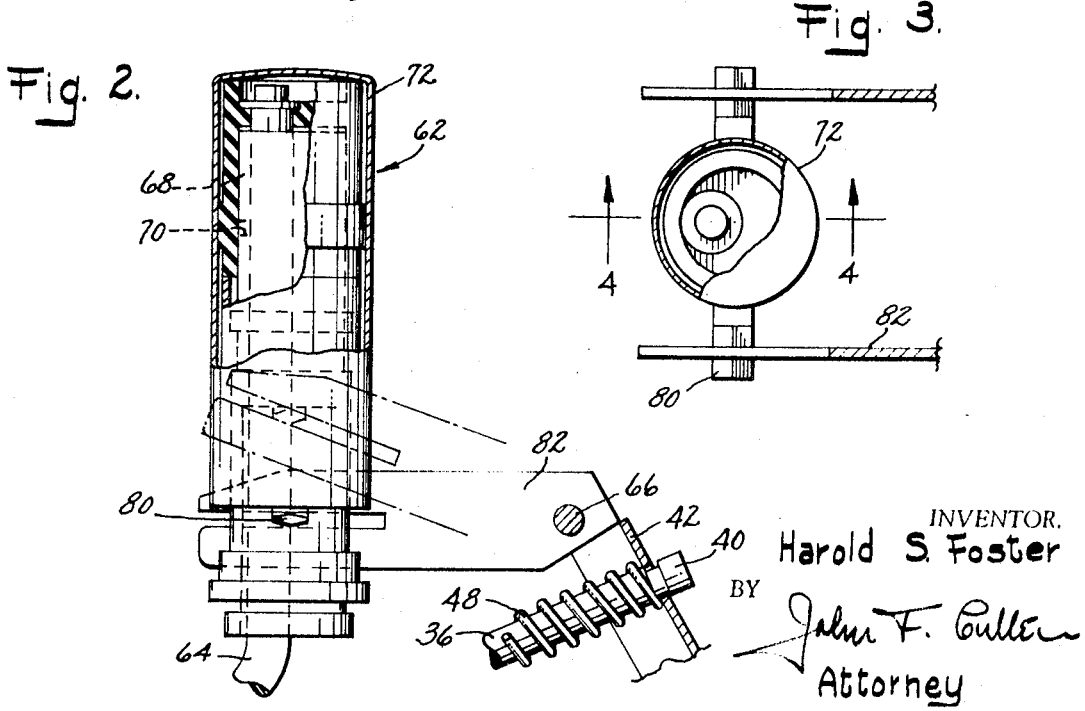
INVENTOR.
Harold S. Foster
BY
John F. Cullen
Attorney

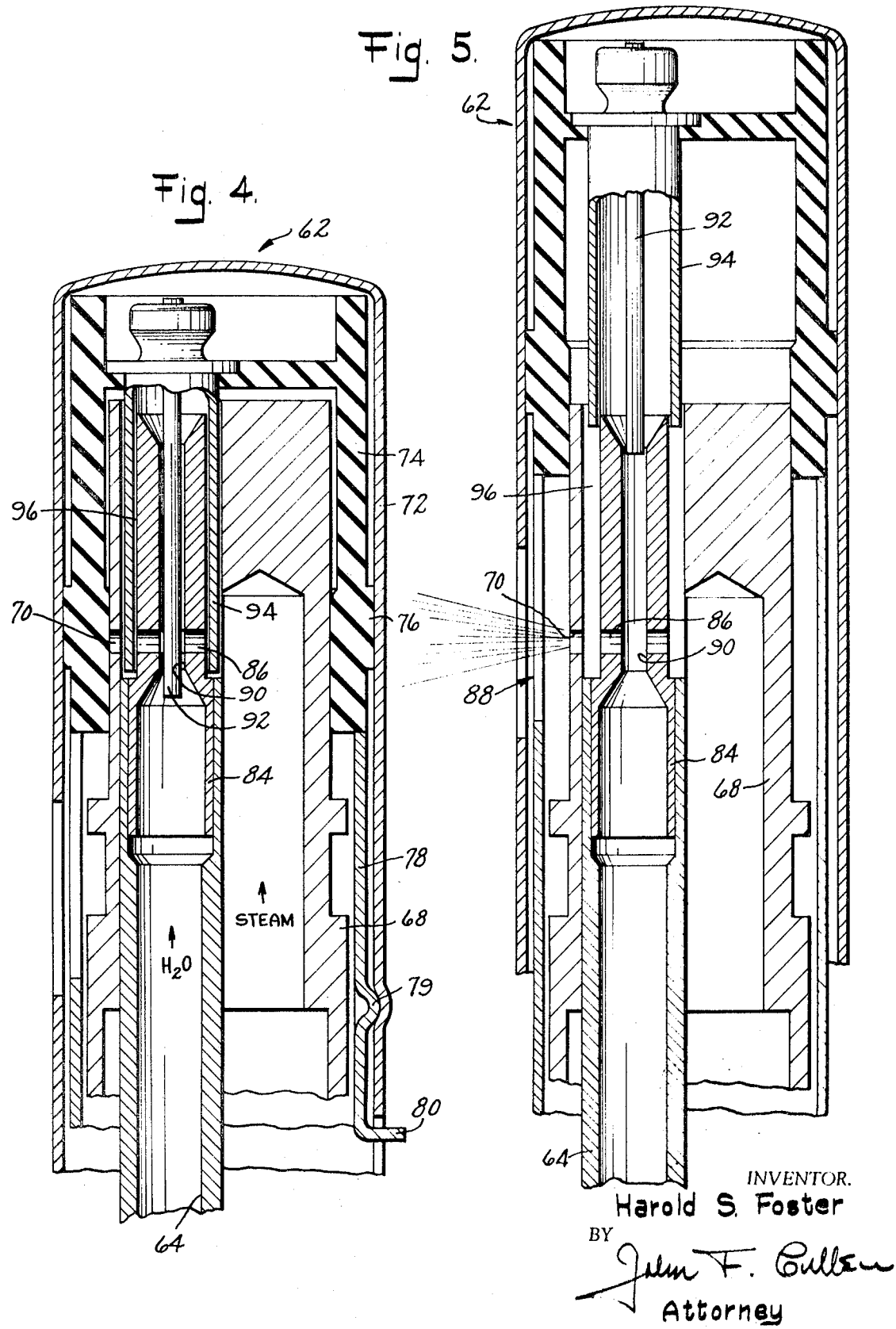

United States Patent Office 3,624,937
Patented Dec. 7, 1971

---

3,624,937
IRON WITH CLEANABLE SPRAYER
Harold S. Foster, Ontario, Calif., assignor to
General Electric Company
Filed Dec. 15, 1969, Ser. No. 885,081
Int. Cl. D06f 75/06
U.S. Cl. 38—77.83                    14 Claims

ABSTRACT OF THE DISCLOSURE

The disclosure herein shows a steam and spray iron werein the sprayer is self-cleaning to remove any deposits when the iron is used with tap water.

---

BACKGROUND OF THE INVENTION

(1) Field of the invention

This invention relates to a steam and spray iron that employs a self-cleaning sprayer for removal of deposits formed in the critical passages when the iron is used on ordinary tap water.

(2) Description of the prior art

With the advent of irons using water for either steam or spray purposes or both, a water tank is generally provided in the iron above the soleplate and water valve structure provides controlled water drippage into a steam generator where it is evaporated and directed out steam outlets in the soleplate to steam the article. Spray attachments have been added to such irons to supply a fine spray from the water tank to spray onto the garment. Such spray attachments may be manual where each actuation of a suitable button pumps a spurt of water or the spray attachment may be powered where, by suitable valving, the steam pressure is raised and directed to the spray where it aspirates and pressurizes the water so that a single depression of the button provides a continuous spray until the button is released. A typical spray iron of this type is shown in U.S. Pat. 3,041,757 of common assignment. Generally, it has been preferable to use distilled water in such steam irons because of the fineness of the various water passages and orifices which are subject to clogging due to the mineral deposits from the water, which varies from one locality to another. Distilled water creates no problems but in the hostile hard water localities, the tap water contains minerals and/or dissolved solids which produce loose flakes and deposits that plate out on the iron components and can clog the fine passages in the spray attachment. These deposits vary from the water in various areas of the country and generally consist of lime or calcium carbonate as well as other chemicals that are in solution in the water or may be in relatively large flake form in the water. Various screens and clean-out structures have been designed to prevent such deposits or flakes from clogging the fine water passages and a typical construction to ensure relatively clean water reaching the sprayer is disclosed in Pat. No. 3,497,974 dated Mar. 3, 1970 of common assignment. However, while the flakes may be screened out, the minerals in solution in the water may still reach the sprayer through the water tube which goes from the water reservoir to the sprayer and deposits may be formed therein. The build-up of a coating or deposits then causes a restriction in the flow of water to the sprayer and a change in the spray rate. Prior art construction has not provided a design that has means for cleaning the sprayer on each actuation thereof to remove the deposits and ensure a clean and operable sprayer when tap water is used in the iron.

SUMMARY OF THE INVENTION

Briefly described, the present invention is directed to a steam and spray iron that has a water reservoir and a steam generator connected to receive water from the reservoir and direct steam to the soleplate for application to the ironing surface. In this environment, the invention is directed to an improvement in a self-cleaning sprayer that utilizes a steam tube which has a spray discharge outlet and a water tube that has an orifice adjacent the spray outlet. A fixed spray mixing member is disposed in the water tube and forms a mixing chamber with the steam tube, the mixing chamber at least partially surrounding the water tube discharge and the orifice is formed in the mixing member. In this structure there is provided an orifice cleaning means which may be in the form of a pin and a mixing chamber cleaning means that may be in the form of a sleeve and which are connected together in any suitable fashion such as a concentric arrangement with the pin inside the sleeve whereby they both move together as a unit, the pin moving through the mixing member to clear the orifice and the sleeve moving through the chamber to clear the chamber, both movements taking place on each actuation of the sprayer. Thus, the main object of the invention is to provide a self-cleaning sprayer arrangement for a steam and spray iron whereby the critical passages are cleaned on each actuation of the sprayer.

BRIEF DESCRIPTION OF THE DRAWING

FIG. 1 is a side elevation, partially in section, showing the location of the invention in a flatiron;

FIG. 2 is a partial sectional view of the sprayer assembly and actuation linkage rotated slightly clockwise from the position shown in FIG. 1;

FIG. 3 is a partial top view of the structure shown in FIG. 2;

FIG. 4 is a partial cross section taken on the line 4—4 of FIG. 3 illustrating the sprayer mechanism in the closed position;

FIG. 5 is a view, similar to FIG. 4, showing the sprayer mechanism in the open position; and FIG. 6 is a partial cross-sectional view showing the pin and sleeve cleaning members.

Referring to FIG. 1, an iron embodying this invention may typically include a soleplate 10, connected cover 12 and operating handle 14. In accordance with conventional practice, soleplate 10 may be cast from a material such as aluminum with an electrical heating element cast into position. The heating element preferably is of the sheathed type in which the electrical resistance element 16 extends through an outer tubular protective sheath with the heating element separated from the outer sheath by an electrical insulating compound resistant to heat such as a mass of granulated and compressed magnesium oxide as well-known in the art. In the usual manner, the heating element extends in a loop from the rear of the iron along one side to the forward or pointed end and then rearwardly along the other side. Thus, a substantially uniform heat distribution is provided, especially when an aluminum soleplate or coated soleplate is employed.

The iron includes means for generating vapor under pressure and typically this may be used to convert water into steam and the invention is described in connection with water although the term is intended to cover other liquids. For steam generation, soleplate 10 is provided with a steam generator in the form of cavity 18. Water tank 20 supplies water to orifice 22 in valve body 23 which is controlled by valve stem 24 that is actuated by stepped button 25 as later explained, whereby water drips onto the hot soleplate and is converted into steam. The steam so generated is confined and directed over the heated upper surface of the soleplate by coverplate 26 and thence out steam outlets 28. A steam collecting dome 30 is tightly sealed to coverplate 26 in any suitable fashion and also supports various components of the iron including valve body 23. It also carries a pressure balancing tube 32 which transmits the pressure from the steam generator to the upper portion of the water reservoir 20. All connections to the steam dome are liquid tight, accomplished by brazing, metal spinning, or other equally well-known techniques. Steam produced in generator 18 is directed upwardly for downward flow through a normally open discharge control valve orifice 34 and then flows freely through the steam outlets 28 to the ironing surface. The sizes of orifices 22 and 34 determine pressure and are generally arranged so that steam flows through outlets 28 with only a low pressure build-up while the orifice 34 is open. The reason for any pressure at all is to keep the pressure differential between steam and spray operation small to prevent possible violent boiling and flooding through the soleplate when switching from spray to steam operation.

Orifice 34 is controlled by elongated cylindrical valve stem 36 within pressure balancing tube 32. Valve stem 36 extends through the upper portion of a steam conduit 38 and has loosely connected to its upper end 40 a horizontally extending lever 42 in turn attached to upwardly extending arm 44 connected with manually operated pushbutton 46 in the front portion of the hollow interior of handle 14. Since valve stem 36 should normally be open for steaming, there is provided a spring 48 surrounding the upper end of the valve stem and compressed between lever 42 and the upper end of steam conduit 38. The bias of spring 48 ensures that orifice 34 is normally open. Cleaning of orifice 34 is provided by the reduced size tip on the end of valve stem 36.

During operation as a steam iron, steam generated in cavity 18 rises upwardly through balance tube 32, which extends above the water line in reservoir 20, so that the same steam pressure exists in the upper portion of the reservoir. Since valve stem 36 is normally up or open, there is an open discharge path for the steam through the soleplate and consequently there is no significant build-up in steam pressure. Thus, very little steam passes through the pressure balancing tube 32 and hence the amount of steam condensation into the normally colder water in the reservoir is minimal. Due to this and coupled with the fact that no minimum steam pressure is needed to start the steaming operation, very rapid starting is obtained when the water in the tank is cold.

For maximum use in various operations, the iron should be operable as a dry iron, as a steam iron, or as a liquid sprayer. Therefore, means are provided for controlling whether or not steam is generated within the iron. This includes the elongated valve stem 24, guidedly carried in apertured tubular guide 52 and the top of filler cap 54, connecting with formed rod 56 to the stepped steam button 25 in the handle. Valve stem 25 is urged upwardly by suitable spring 60, which may be compressed when button 25 is depressed, and the stepped portion is locked under the handle surface whereby stem 24 closes orifice 22 and the iron is operable as a dry iron at any desired setting as determined by standard thermostatic control 61.

To spray water on fabric, there is provided a liquid sprayer head or nozzle assembly generally shown at 62, and enlarged in FIG. 2, arranged within the iron handle and partially extending through an opening within the handle. Preferably, the sprayer is directed in a generally downward direction so that the fabric being ironed can be dampened without lifting the iron. The spray head assembly is sealed to steam conduit 38 which extends upwardly from the water reservoir. It can be seen from FIG. 1 that steam conduit 38 is aligned with pressure balance tube 32 so that conduit 38 is in relatively direct communication with the steam generator. Also connected with the spray head assembly 62 is a water tube 64 communicating at its lower end with the bottom of the reservoir 20, and at its upper end with the spray nozzle assembly 62.

Spraying may be a manual spray in which button 46 operates a pump not shown on each individual actuation of the button whereupon a slug of water is pumped up water tube 64 and out the spray assembly. This requires a constant repetitive pumping action and is shown in U.S. Pat. 3,183,611 of common assignment. On the other hand, a powered sprayer of the type described herein requires only a single operation of button 46 whereupon spray issues from assembly 62 as long as the button is held down so no pumping is required and the invention is applicable to either. In the power version, spray is obtained by depressing button 46, which rocks lever 42 about a pivot 66 thus forcing valve stem 36 downward to close orifice 34 whereupon steam pressure then builds in the system and up into the steam conduit 38 and into the assembly 62. Additionally, the steam pressure on the water surface in reservoir 20 forces the water up water tube 64 and into the assembly 62.

A variety of nozzle sprayer assemblies may be employed and typical modifications of such sprayers are shown in said '757 patent. Generally, referring to FIG. 4 herein, the assembly includes a steam tube 68 which is really an extension of and has its lower end attached and opening into steam conduit 38 and in the upper portion thereof it is provided with a spray discharge outlet 70 which is normally directed down onto the surface directly in front of the iron with the spray assembly extending beyond the front of the handle as can be seen in FIG. 1 and indicated by the spray lines. The outlet is controlled by the movement of a cap 72 which, in the instant invention, moves together with an internal tubular gasket member 74 of a resilient material such as silicone rubber and which is in rotating frictional engagement with the cap by annular rib 76. Movement of the cap and gasket together is obtained by a lifting mechanism that may be an additional tube 78 abutting the bottom of gasket 74 and attached to cap 72 by dimples 79 as generally shown in FIG. 4. Thus, movement of tube 78 carries gasket 74 and cap 72 into the upper position shown in FIG. 5 where spray discharge outlet 70 is uncovered and, as shown, spraying occurs as will be explained. For positive lifting to opened position, the tube 78 also uses an ear 80 which serves as the connection between the sprayer and the lifting mechanism as best shown in FIGS. 2 and 3. Ear 80 is straddled by a bifurcated member 82 that is the other end of lever 42 rotating about pivot 66.

Thus, with the shorter moment arm between valve stem 36 and pivot 66 and the longer moment arm between pivot 66 and lifting ears 80, it will be seen that the steam to the soleplate is shut off at orifice 34 early enough that it can build up before the sprayer outlet 70 is uncovered whereby the full iron steam pressure is available for spraying. Actually, ear 80 is shown in FIG. 4 rotated 90° from its actual position merely to illustrate how it lifts tube 78. FIG. 2 shows the correct position at right angles to the spray outlet.

In the operation of the spray iron tests have shown that lime deposits coat the inside of water tube 64 when tap water is used. This build-up of coating or deposits causes a restriction in the flow of water to the sprayer and a subsequent drop in the spray rate. One way to correct this deficiency is to increase the size of the water tube to compensate for the deposits but this then results in spray rates that are too high. Tests on different size water tubes have indicated that the deposits occur at different points along the tube depending on the tube diameter. It was thought that a pressure drop might be occurring in the tube causing the water to boil and deposit out the minerals at the point of boiling. It appeared that if the point of boiling could be controlled then it would be possible to allow the deposit to occur at that point and then clean it and the structure of the instant invention is designed for that purpose.

Referring again to FIG. 4, to control the location of the boiling, the upper end of water tube 64 is provided with a fixed spray mixing member 84 that acts as an extension of the water tube. Mixing member 84 has a suitable diametrical passage 86 opening into spray outlet 70 as shown to provide water for the spray. When the cap 72 is raised from its closed or sealed position with gasket 74 covering outlet 70 as shown in FIG. 4, it opens the outlet 70 for spray operation as shown in FIG. 5. In this position, steam flows upwardly in steam tube 68 through passage 86 and through the outlet 70 onto the surface to be sprayed. As high speed steam travels through the passage 86 in the upper end of water tube 64, the aspiration effect causes water to be drawn upwardly through the tube into the outlet 70 and to be discharged as a fine liquid spray. Of course, both the cap 72 and the lifting tube 78 have suitable openings, generally indicated at 88, so as not to hinder the spray flow.

In order to control the boiling point and therefore the mineral deposits, the mixing member 84 water tube extension is formed with a metering orifice 90 that is adjacent the spray outlet 70. Orifice 90 may be conveniently formed in a reduced diameter section of mixing member 84 as shown, and as a metering orifice, it discharges adjacent the spray outlet 70 into the passage 86 and, more importantly, it acts as a venturi to provide a controlled low pressure area where the boiling and consequent mineral deposition will occur.

Since this is a relatively small area, it is possible to clean it on each actuation of the control means that operates the sprayer. This orifice cleaning means may conveniently take the form of clean-out pin 92 that may be suitably fastened to any of the structure that is moveable for operation on each actuation of the sprayer. Thus, the pin may be concentrically carried along the central axis of a second cleaning means in the form of a sleeve 94 which is secured to the top portions of gasket 74 for operation with the up-and-down motion of the gasket from the closed position of FIG. 4 to the open position of FIG. 5. The connection between pin 92 an dsleeve 94 may be a simple crimping operation as shown in FIG. 6 or any other equivalent means. Thus, each operation of the sprayer cleans any deposits from orifice 90.

In order to control the atomization and provide a consistent spray, it is known to use a mixing chamber in the area upstream of outlet 70. Such a chamber 96 may be formed of a reduced diameter on water tube 64 or, in the instant invention, by forming it with mixing member 84 as clearly shown in FIG. 5. The mixing chamber 96 extends at least partially around the mixing member extension of water tube 64 and this chamber 96 allows some mixing of the water and steam before exiting through outlet 70 thereby to provide a more homogeneous spray. It will be apparent that mineral deposits may also form in the chamber 96 and it is desirable that this be provided with cleaning means also and sleeve 94 performs this function. Thus, movement of the pin and sleeve together as a unit as seen in FIG. 6 clears both the orifice and chamber together on each actuation of the sprayer.

It will be seen that the instant invention controls the area of mineral deposits and, by the structure shown, then removes such deposits by the pin clearing the water tube orifice and the sleeve clearing the mixing chamber and both occur simultaneously on each actuation of the control means that operates the sprayer. Consequently, such a power spray equipped iron is more adaptable for use with tap water and may be widely used since each operation actuates the self-cleaning sprayer mechanism.

While there has been described a preferred form of the invention, obvious equivalent variations are possible in light of the above teachings. It is therefore to be understood that within the scope of the appended claims the invention may be practised, otherwise than as specifically described, and the claims are intended to cover such equivalent variations.

What is claimed is:

1. In a steam and spray iron having a water reservoir and a steam generator connected to receive water from said reservoir and direct steam to the ironing surface, the improvement in a self-cleaning sprayer comprising:
   a steam tube having a spray discharge outlet,
   a water tube with passage means connecting said steam tube and outlet for steam flow through the passage,
   said water tube having a separate metering orifice therein controlling water flow to said passage,
   control means to open and close said spray outlet, and
   an orifice cleaning means connected to move into said orifice on actuation of said control means to closed position.

2. Apparatus as described in claim 1 wherein a fixed spray mixing member is disposed in said water tube and said metering orifice is formed in said mixing member.

3. Apparatus as described in claim 1 wherein said orifice cleaning means is a pin connected to move in said water tube to clear said orifice on each actuation of said sprayer.

4. Apparatus as described in claim 2 wherein said orifice cleaning means is a pin connected to move through said mixing member and said orifice to clear said orifice on each actuation of said sprayer.

5. In a steam and spray iron having a closed water reservoir and a steam generator connected to receive water from said reservoir and direct steam to the ironing surface, the improvement in a self-cleaning sprayer comprising:
   a steam tube having a spray discharge outlet,
   a water tube discharging adjacent said outlet,
   a steam-water mixing chamber at least partially surrounding said water tube discharge,
   control means to open and close said spray outlet, and
   a cleaning means for said mixing chamber connected to move into said chamber on actuation of said control means to closed position.

6. Apparatus as described in claim 5 wherein a fixed spray mixing member is disposed in said water tube and said mixing member and steam tube from said mixing chamber.

7. Apparatus as described in claim 5 wherein said mixing chamber cleaning means is a sleeve connected to move in said chamber to clear said chamber on each actuation of said sprayer.

8. Apparatus as described in claim 6 wherein said mixing chamber cleaning means is a sleeve connected to move through said mixing chamber to clear said chamber on each actuation of said sprayer.

9. In a steam and spray iron having a closed water reservoir and a steam generator connected to receive water from said reservoir and direct steam to the ironing surface, the improvement in a self-cleaning sprayer comprising:
   a steam tube having a spray discharge outlet,
   a water tube having a metering orifice and discharging adjacent said spray outlet,
   a steam-water mixing chamber at least partially surrounding said water tube discharge, and
   an orifice cleaning means and a mixing chamber cleaning means connected to move into said orifice and said chamber respectively on actuation of said control means to closed position.

10. Apparatus as described in claim 9 wherein a fixed spray mixing member is disposed in said water tube forming said mixing chamber with said steam tube and said metering orifice is formed in said mixing member.

11. Apparatus described in claim 9 wherein said mixing chamber cleaning means is a sleeve and said orifice cleaning means is a pin connected to move in said chamber and water tube respectively to clear said chamber and tube on each actuation of said sprayer.

12. Apparatus as described in claim 10 wherein said mixing chamber cleaning means is a sleeve and said orifice cleaning means is a pin connected to move through said chamber and said mixing member respectively to clear said chamber and said orifice on each actuation of said sprayer.

13. Apparatus as described in claim 12 where said pin and sleeve are movable together on a unit.

14. Apparatus as described in claim 13 where said pin is disposed along the central axis of said sleeve and connected to said sleeve for movement thereby upon actuation of said sleeve.

References Cited

UNITED STATES PATENTS

| | | | |
|---|---|---|---|
| 2,762,143 | 9/1956 | Hoecker | 38—77.5 |
| 3,041,757 | 7/1962 | Swenson et al. | 38—77.83 |
| 3,130,507 | 4/1964 | Hoecker | 38—77.5 |

PATRICK D. LAWSON, Primary Examiner

PO-1050
(5/69)

UNITED STATES PATENT OFFICE
CERTIFICATE OF CORRECTION

Patent No. 3,624,937　　　　　　　　Dated December 7, 1971

Inventor(s) Harold S. Foster

It is certified that error appears in the above-identified patent and that said Letters Patent are hereby corrected as shown below:

In the drawings, the filing date reading "Dec. 15, 1970" should read -- Dec. 15, 1969 --. Column 6, line 43, "from" should read -- form --.

Signed and sealed this 13th day of June 1972.

(SEAL)
Attest:

EDWARD M. FLETCHER, JR.　　　　ROBERT GOTTSCHALK
Attesting Officer　　　　　　　　Commissioner of Patents